United States Patent
Shani et al.

(10) Patent No.: US 10,970,172 B2
(45) Date of Patent: Apr. 6, 2021

(54) METHOD TO RECOVER METADATA IN A CONTENT AWARE STORAGE SYSTEM

(71) Applicant: EMC IP Holding Company LLC, Hopkinton, MA (US)

(72) Inventors: Nimrod Shani, Raanana (IL); Tal Zohar, Tel Aviv (IL); Nadav Krispin, Tel Aviv (IL); Leron Fliess, Kiryat Ono (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 86 days.

(21) Appl. No.: 16/397,272

(22) Filed: Apr. 29, 2019

(65) Prior Publication Data
US 2020/0341849 A1    Oct. 29, 2020

(51) Int. Cl.
*G06F 12/00* (2006.01)
*G06F 13/00* (2006.01)
*G06F 13/28* (2006.01)
*G06F 11/14* (2006.01)
*G06F 3/06* (2006.01)

(52) U.S. Cl.
CPC ........ *G06F 11/1435* (2013.01); *G06F 3/0619* (2013.01); *G06F 3/0689* (2013.01); *G06F 11/1458* (2013.01); *G06F 11/1471* (2013.01); *G06F 3/0653* (2013.01); *G06F 11/1448* (2013.01); *G06F 11/1469* (2013.01)

(58) Field of Classification Search
CPC .............. G06F 3/0619; G06F 11/1469; G06F 11/1458; G06F 11/1448
USPC ....................................................... 711/162
See application file for complete search history.

(56) References Cited

U.S. PATENT DOCUMENTS

| | | | |
|---|---|---|---|
| 8,141,149 B1 | 3/2012 | Henry et al. | |
| 8,417,987 B1 | 4/2013 | Goel et al. | |
| 9,225,668 B2 | 12/2015 | Lih et al. | |
| 10,015,101 B2 | 7/2018 | Agarwal et al. | |
| 2002/0016827 A1 | 2/2002 | McCabe et al. | |
| 2003/0120822 A1 | 6/2003 | Langrind et al. | |
| 2008/0282105 A1* | 11/2008 | Deenadhayalan | G06F 11/1076 714/6.12 |
| 2009/0083610 A1 | 3/2009 | Arai et al. | |

(Continued)

OTHER PUBLICATIONS

Non-Final Office Action dated Apr. 13, 2020, U.S. Appl. No. 16/259,099, 16 pages.

(Continued)

*Primary Examiner* — Edward J Dudek, Jr.
*Assistant Examiner* — Sidney Li
(74) *Attorney, Agent, or Firm* — Daly Crowley Mofford & Durkee, LLP

(57) ABSTRACT

A method is disclosed for recovering metadata, the method comprising: identifying a corrupt or missing metadata entry, the corrupt or missing metadata entry being part of a mapping structure that is stored in a random-access memory (RAM) of a storage system; selecting a metadata backup page that is associated with the mapping structure; identifying a plurality of copies of the selected metadata backup page; identifying a most recent copy among the plurality of copies of the selected metadata backup page; and recovering the corrupt or missing metadata entry based on the most recent one of the plurality of copies of the metadata backup page.

12 Claims, 9 Drawing Sheets

480

| | | | |
|---|---|---|---|
| MD_BACKUP_LOGICAL_ADDRES_1 | 544 | MD_ADDRESS_ID_8 | 548 |
| MD_BACKUP_LOGICAL_ADDRES_2 | 544 | MD_ADDRESS_ID_9 | 548 |
| MD_BACKUP_LOGICAL_ADDRES_3 | 544 | MD_ADDRESS_ID_10 | 548 |
| MD_BACKUP_LOGICAL_ADDRES_4 | 544 | *UNRECOVERABLE* | 539 |
| MD_BACKUP_LOGICAL_ADDRES_5 | 544 | MD_ADDRESS_ID_11 | 548 |
| MD_BACKUP_LOGICAL_ADDRES_6 | 544 | MD_ADDRESS_ID_12 | 548 |
| MD_BACKUP_LOGICAL_ADDRES_8 | 544 | MD_ADDRESS_ID_13 | 548 |

542, 542, 542, 541, 542, 542, 542

(56) References Cited

U.S. PATENT DOCUMENTS

| | | | |
|---|---|---|---|
| 2010/0070729 A1* | 3/2010 | Ng | G06F 3/0631 |
| | | | 711/166 |
| 2011/0252274 A1 | 10/2011 | Kawaguchi et al. | |
| 2015/0012503 A1 | 1/2015 | Akirav et al. | |
| 2017/0091052 A1* | 3/2017 | Gao | G06F 11/1662 |
| 2017/0317943 A1 | 11/2017 | Xu et al. | |
| 2017/0373989 A1 | 12/2017 | Gafni et al. | |
| 2018/0063030 A1 | 3/2018 | Mitulal et al. | |
| 2018/0364917 A1 | 12/2018 | Ki et al. | |
| 2019/0068516 A1 | 2/2019 | Meng et al. | |
| 2020/0014778 A1 | 1/2020 | Mangin | |
| 2020/0053018 A1 | 2/2020 | White et al. | |

OTHER PUBLICATIONS

U.S. Appl. No. 16/259,099, filed Jan. 28, 2019, Shani et al.
U.S. Appl. No. 16/260,391, filed Jan. 29, 2019, Shani et al.
Non-Final Office Action dated Sep. 24, 2020, U.S. Appl. No. 16/260,391, 15 pages.
Response to Office Action filed Dec. 15, 2020 for U.S. Appl. No. 16/260,391; 9 pages.
Notice of Allowance dated Jan. 7, 2021 for U.S. Appl. No. 16/260,391; 10 pages.

* cited by examiner

US 10,970,172 B2

1

METHOD TO RECOVER METADATA IN A CONTENT AWARE STORAGE SYSTEM

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

According to aspects of the disclosure, a method is provided for recovering metadata disclosed, the method comprising: identifying a corrupt or missing metadata entry, the corrupt or missing metadata entry being part of a mapping structure that is stored in a random-access memory (RAM) of a storage system; selecting a metadata backup page that is associated with the mapping structure; identifying a plurality of copies of the selected metadata backup page; identifying a most recent copy among the plurality of copies of the selected metadata backup page; and recovering the corrupt or missing metadata entry based on the most recent one of the plurality of copies of the metadata backup page.

According to aspects of the disclosure, system is provided comprising: a memory; and at least one processor operatively coupled to the memory, the at least one processor being configured to perform the operations of: identifying a corrupt or missing metadata entry, the corrupt or missing metadata entry being part of a mapping structure that is stored in a random-access memory (RAM) of a storage system; selecting a metadata backup page that is associated with the mapping structure; identifying a plurality of copies of the selected metadata backup page; identifying a most recent copy among the plurality of copies of the selected metadata backup page; and recovering the corrupt or missing metadata entry based on the most recent one of the plurality of copies of the metadata backup page.

According to aspects of the disclosure, a non-transitory computer-readable storage medium is provided that is configured to store one or more processor executable instructions, which when executed by at least one processor cause the at least one processor to perform the operations of: identifying a corrupt or missing metadata entry, the corrupt or missing metadata entry being part of a mapping structure that is stored in a random-access memory (RAM) of a storage system; selecting a metadata backup page that is associated with the mapping structure; identifying a plurality of copies of the selected metadata backup page; identifying a most recent copy among the plurality of copies of the selected metadata backup page; and recovering the corrupt or missing metadata entry based on the most recent one of the plurality of copies of the metadata backup page.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1:
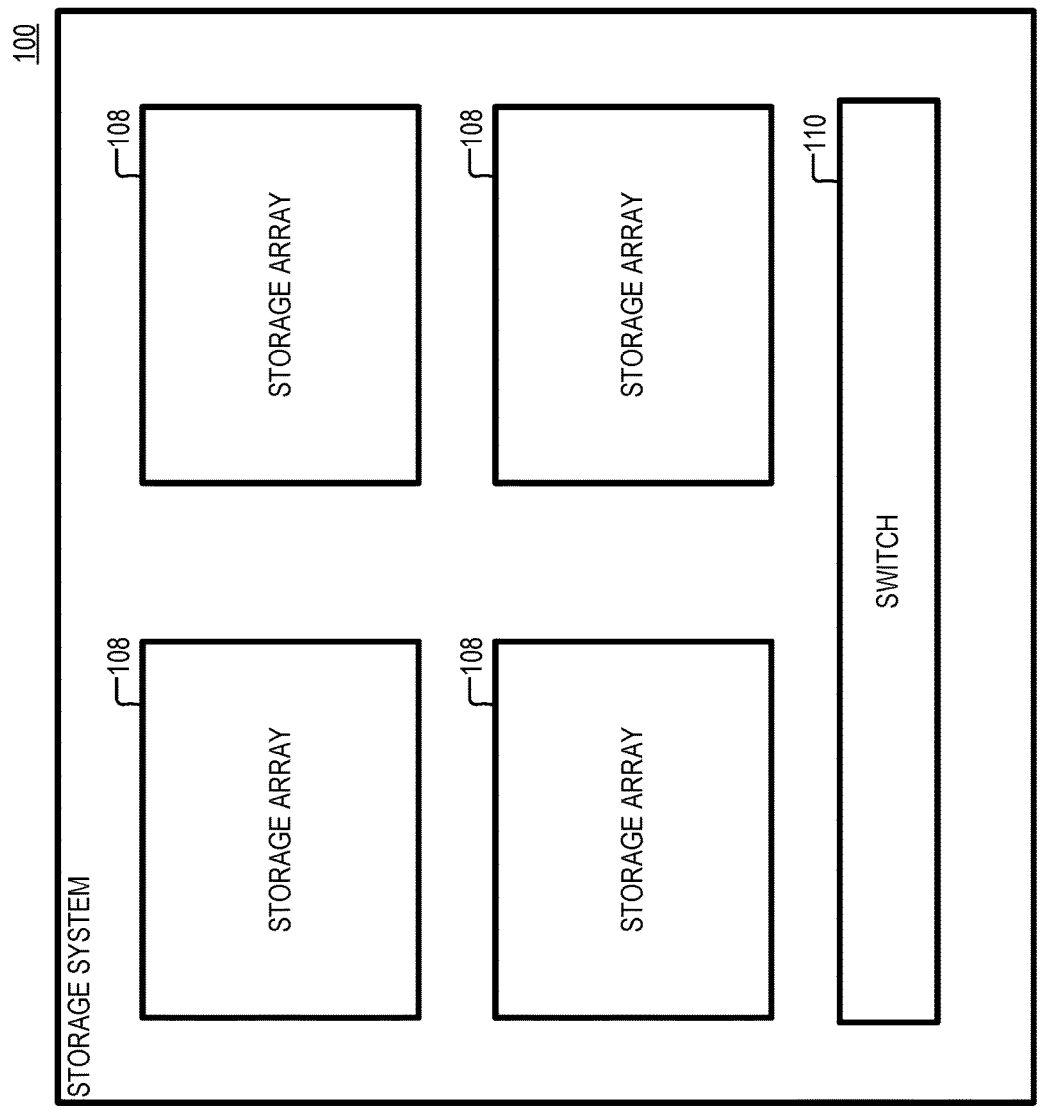
FIG. 1 is a diagram of an example of a distributed storage system, according to aspects of the disclosure.

FIG. 1 is a diagram of an example of a storage system 100, according to aspects of the disclosure. The storage system 100 may include any suitable type of storage system, such as a content-based storage system or a log structured storage system. In some implementations, the storage system 100 may include one or more storage arrays 108 coupled to one another via a network switch 110. Aspects of the operation of the storage system 100 are discussed further below with respect to FIGS. 2-10.

Figure 2:
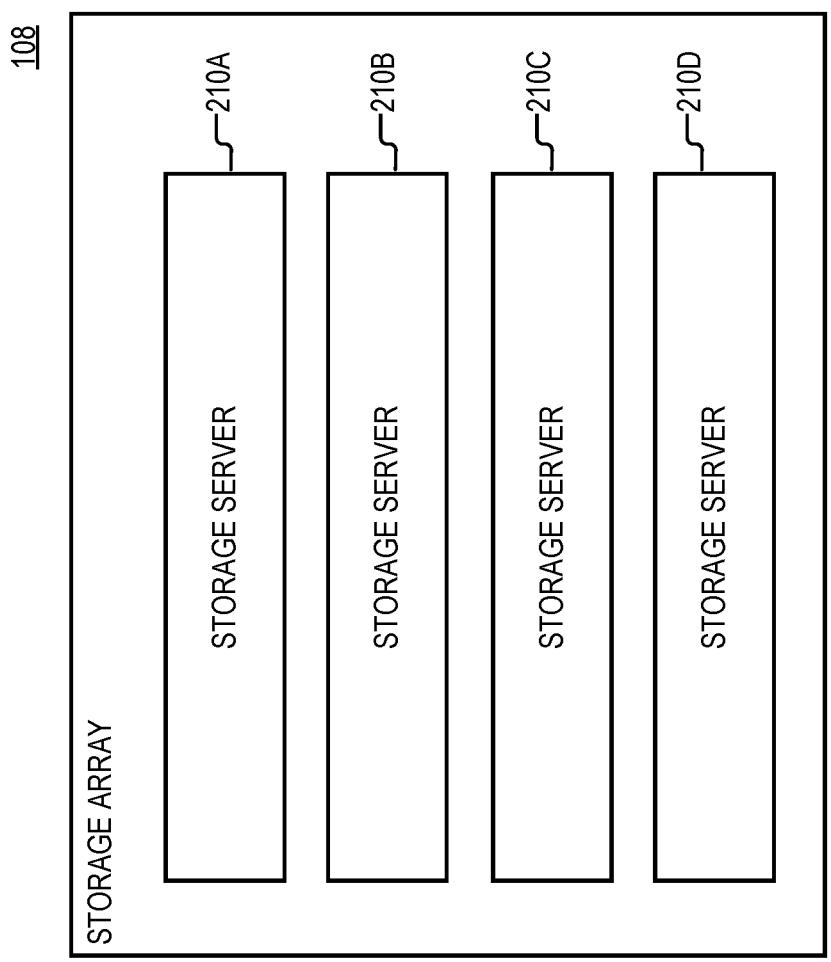
FIG. 2 is a diagram of an example of a storage array that is part of the distributed storage system of FIG. 1, according to aspects of the disclosure.

FIG. 2 is a diagram of a storage array 108 that is part of the storage system 100, according to aspects of the disclosure. The storage array 108 may include a plurality of storage servers 210 that are coupled to one another in a network (e.g., a mesh network). The network may include an InfiniBand network, a TCP/IP network, and/or any other suitable type of network. As is discussed further below, each of the storage servers 210 may be configured to execute one or more I/O providers. Each I/O provider may include one or more service processes for processing incoming I/O requests.

Figure 3:
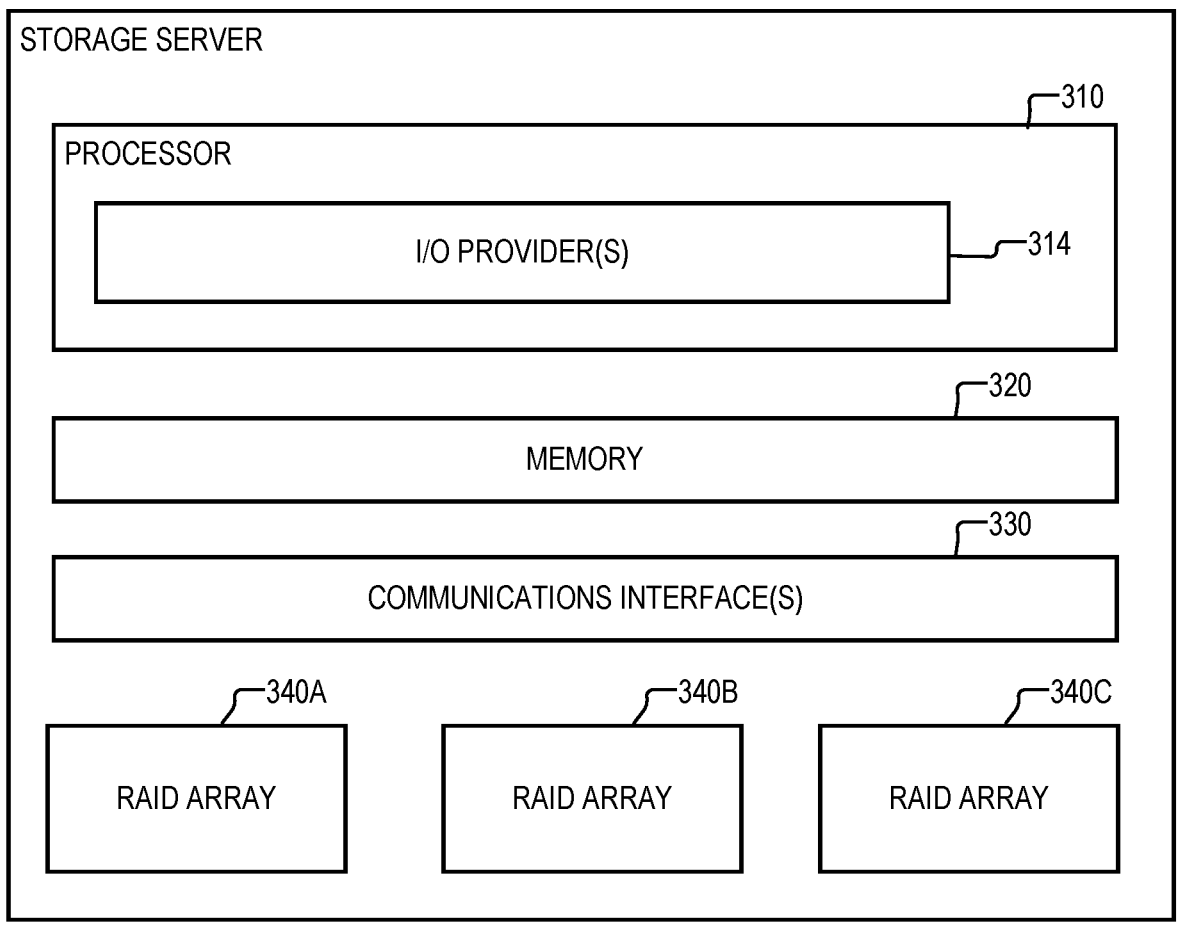
FIG. 3 is a diagram of an example of a storage server that is part of the storage array of FIG. 2, according to aspects of the disclosure.

FIG. 3 is a diagram of an example of a storage server 210, which as the numbering suggests, is representative of any of the storage servers 210A-D in the storage array 108. As illustrated, the storage server 210 may include a processor 310, a memory 320, a communications interface(s) 330, and a plurality of storage devices 340 that are operatively coupled to one another. The processor 310 may include any of one or more general-purpose processors (e.g, x86 processors, RISC processors, ARM-based processors, etc.), one or more Field Programmable Gate Arrays (FPGAs), one or more application specific circuits (ASICs), and/or any other suitable type of processing circuitry. The memory 320 may include any suitable type of volatile and/or non-volatile memory. In some implementations, the memory 320 may include one or more of a random-access memory (RAM), a dynamic random memory (DRAM), a flash memory, a hard drive (HD), a solid-state drive (SSD), a network accessible storage (NAS), and or any other suitable type of memory device. The communications interface(s) 330 may include any suitable type of communications interface, such as one or more Ethernet adapters, one or more Wi-Fi adapters (e.g., 802.1414 adapters), and one or more Long-Term Evolution (LTE) adapters, for example. The storage devices 340 may be configured to form at least a portion of the storage system 100. In the present example, the storage devices 340 are solid state drives (SSD). However, alternative implementations are possible, in which at least one of the storage devices is a spinning hard disk (HD), a flash driver, a Read-Only Memory (ROM), a Random-Access Memory (RAM), and/or any other suitable type of volatile and non-volatile memory.

According to the present example, the processor 310 may be configured to execute at least I/O provider(s) 314. The I/O provider(s) 314 may include one or more processes for executing incoming I/O requests (e.g, write requests). Although in the present example, the I/O provider 314 is implemented in software, alternative implementations are possible in which the I/O provider 314 is implemented in hardware or as a combination of hardware and software. Stated succinctly, the present disclosure is not limited to any specific implementation of the I/O provider. As used throughout the disclosure, the term "I/O provider" may refer to any process which, alone or in combination with other processes, is configured to execute I/O requests that are received at the storage system 100, such as write requests for example.

Figure 4:
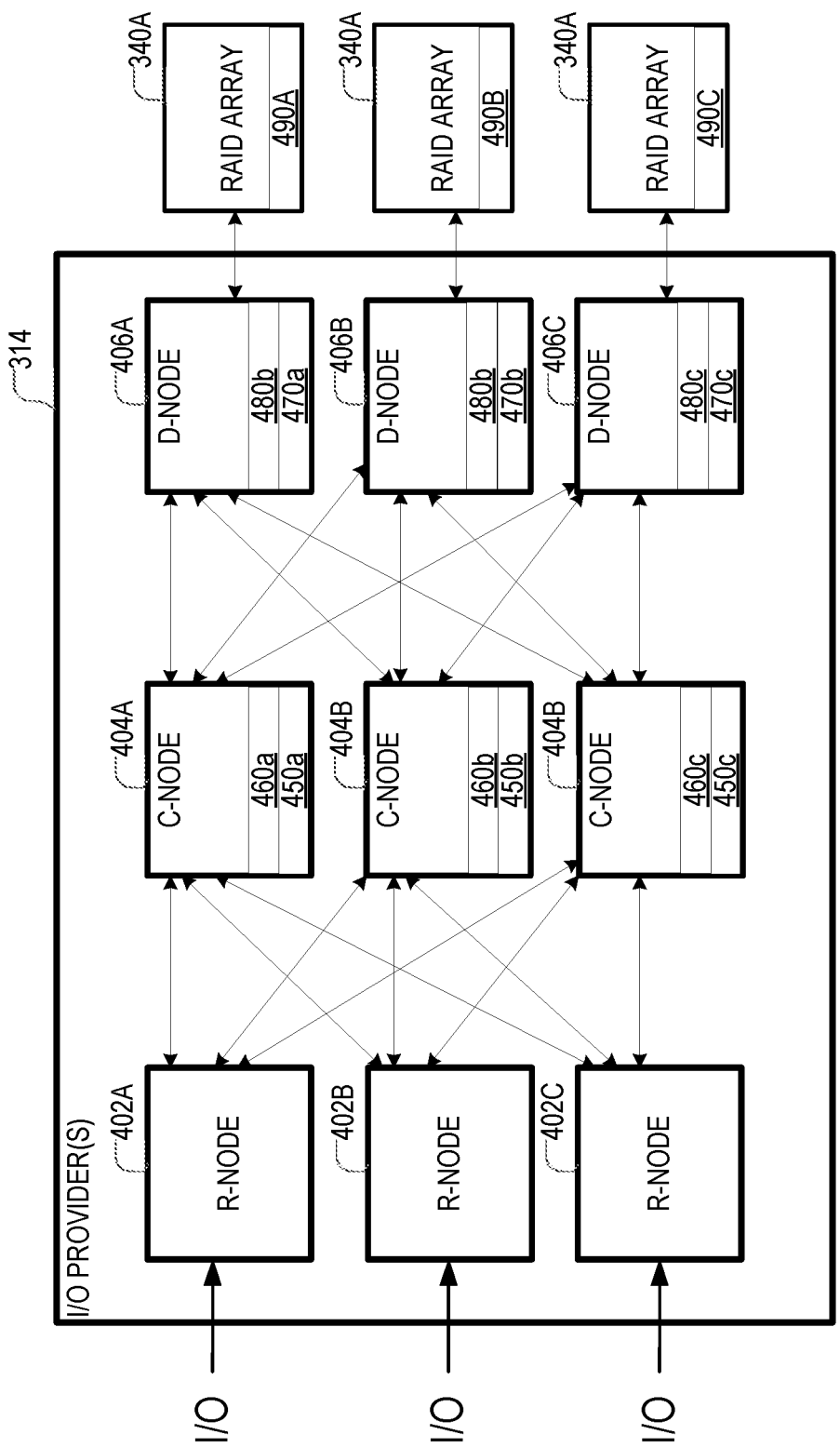
FIG. 4 is a diagram of an example of a disk I/O provider that is executed by the storage server of FIG. 3, according to aspects of the disclosure.
Figure 5:
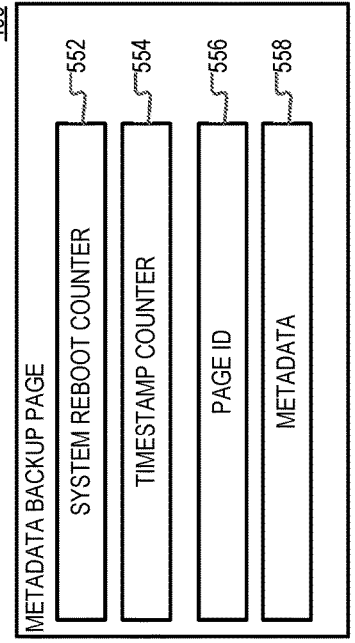
FIG. 5A is a diagram of an example of a H2P structure, according to aspects of the disclosure.
FIG. 5B is a diagram of an example of a Plonter structure, according to aspects of the disclosure.
FIG. 5C is a diagram of an example of a metadata backup page, according to aspects of the disclosure.

FIG. 4 is a diagram illustrating an example of one implementation of the I/O provider 314. According to the present example, the I/O provider 314 includes I/O providers 402, 404, and 406, which are herein referred to as routing nodes (R-nodes), control nodes (C-nodes), and data nodes (D-nodes) respectively. The R-nodes, the C-nodes, and the D-nodes are connected to one another in a mesh network (e.g., an InfiniBand network). According to the present example, the R-nodes, the C-nodes, and the D-nodes are part of the same I/O provider, and as such they are executed on the same storage server. However, it will be understood that alternative implementations are possible in which at least some of the R-nodes, the C-nodes, and the D-nodes are executed on different storage servers and/or are part of different I/O providers.

The R-nodes 402 may be configured to terminate/O requests received at the storage system 100 and route them to appropriate C-nodes 404 and D-nodes 406 for further execution. In doing so, the R-nodes 402 may distribute a workload over multiple C-nodes 404 and D-nodes 406. In some implementations, any of the R-nodes 402 may be configured to write I/O requests (e.g., SCSI I/O requests) to selected ones of the C-nodes 404 for further processing.

The C-nodes 404 may be configured to control the execution of control node commands supplied by the R-nodes 402. The control node commands may be used to implement read requests, write requests, and/or any other suitable type of I/O request. Each of the C-nodes 404 may be configured to receive control node commands from the R-nodes and communicate with the D-nodes 406 to execute the commands. In some implementations, each C-node 404 may maintain an address-to-hash (A2H) structure 460 mapping logical block addresses (LBAs) to hash digests (e.g., short hash digests) of data blocks and a hash-to-D-node (H2D) structure 450 that maps hash digests to the addresses of D-nodes.

Each of the D-nodes 406 may be attached to one or more of the storage devices 340. Each of the D-nodes 406 may store in memory a hash-to-physical-address (H2P) structure 470, and a Plonter structure 480. The H2P structure 470 may identify a plurality of physical addresses in the storage devices 340, and a different respective hash digest that is mapped to each of the physical addresses. At runtime, the H2P structure 470 may be stored in RAM. However, the H2P structure 470 may be backed up into a set of one or more metadata backup pages 490 that are stored on the storage devices 340. The set of metadata backup pages 490 may include the most recently backed up version of the H2P structure 470. In instances in which the set of metadata backup pages 490 includes more than one metadata backup page 490, each of the metadata backup pages 490 may include a different portion of the H2P structure 470.

In some implementations, each of the metadata backup pages 490 may be assigned a respective logical address (e.g., a logical offset), which is mapped by the Plonter structure 480 to a corresponding physical address in one or more of the storage devices 340 where the backup page is stored. As noted above, each metadata backup page 490 may contain a copy of at least a portion of the H2P structure 470. As the H2P structure 470 is repeatedly backed up during the operation of the storage system 100, multiple versions of each of the metadata backup page(s) 490 may be stored in the storage device(s) 340, with the most recent version(s) of the metadata backup page(s) 490 being identified in the Plonter structure 480.

In some implementations, the H2P structure 470 may be situated on the I/O path of the storage system 100, and the Plonter structure 480 may be situated outside of the I/O path. As such, the H2P structure 470 may be accessed for the purpose of retrieving data that is requested to be retrieved by I/O request(s) received at the storage system 100. Furthermore, the H2P structure may be accessed for the purposes of storing data that is requested to be stored by I/O request(s) at the storage system. By contrast, the Plonter structure 480 may be accessed for the purposes of storing and retrieving metadata backup pages. The Plonter structure 480 may not be otherwise involved in the servicing of incoming I/O requests, unless there is a failure in the storage system 100 to identify metadata that is needed for servicing the I/O requests. In other words, the Plonter structure may be accessed for the purposes storing new metadata backup pages 490 or retrieving existing metadata backup pages 490.

In operation, any of the R-nodes 402 may receive, from a multipath agent, a read request for a data payload that spans a range of LBAs. In response to the request, the R-node 402 may decompose the read request into a plurality of control node commands and forward the control node commands to different C-nodes 404 for further processing. In some implementations, each of the control node commands may request its recipient C-node to provide a portion of the data associated with the read request.

In operation, any of the C-nodes 404 may receive a control node command that is generated by one of the routing nodes 402. The control node command may request of the C-node to provide a portion of the data payload associated with the read request received at the R-node, and it may include an LBA associated with the payload portion. In response to receiving the control node command, the C-node 404 may use the A2H structure 460 to identify one or more hash digests (e.g., short has digests) corresponding to the LBA, and then use the H2D structure to identify one or more D-nodes associated with the hash digests. Afterwards, the C-node 404 may decompose the control node command into a plurality of data node commands and forward each of the data node commands to respective ones of the D-nodes that are identified based on the A2H structure 460 and H2D structure 470.

In operation, any of the D-nodes 406 may receive a data node command that is generated by one of the C-nodes 404. The data node command may include a request for a data block (e.g., 4 KB of data) and it may include a hash digest of the data block (e.g., a short hash digest retrieved from the A2H structure 460). Next, the D-node 406 may search its respective H2P structure 470 to identify a physical address in one of the storage devices 340 that corresponds to the hash digest that is contained in the data node command. As a result of the search, the D-node 406 may obtain from its respective H2P structure 470 the physical address of the requested data block. Afterwards, the D-node may use the obtained address of the data block to retrieve the data block from the storage device (e.g., an SSD) where the data block is stored. After the data block is retrieved, the D-node may forward the data block to the sender of the data node command.

The example above describes a scenario in which all of the metadata that is necessary for retrieving a data block is available, and the data block is retrieved successfully. However, other situations are possible in which the requested data block cannot be retrieved because metadata associated with the data block is either corrupt or missing from the H2P structure 470. In such implementations, any of the D-nodes 406 may attempt to recover the metadata from one of more the metadata backup pages 490. To do so, the D-node 406 may determine a logical address of a metadata backup page 490 that contains the metadata. Afterwards, the D-node 406 may search the Plonter structure 480 that is associated with the D-node 406 based on the logical address to obtain a physical address where the metadata backup page 490 is stored. Afterwards, the D-node 406 may retrieve the backup page from the obtained physical address, and extract the missing (or corrupt) metadata from the retrieved page. And finally, the D-node 406 may add the extracted the metadata to the H2P structure 470 and use it to retrieve requested data from the storage device(s) 340. In some implementations, the extracted metadata may be added to the H2P structure 470 without rebuilding the entire structure. However, in instances in which the H2P structure 470 is not currently loaded in memory, the entire H2P structure may be rebuilt by using one or more metadata backup pages.

Moreover, in some instances, in addition to the H2P structure 470, the Plonter structure 480 may also be corrupt or missing data. In such instances, a "deep" data recovery process may be executed to identify the location in of metadata backup page(s) that contain one or more copies of the H2P structure 470 and/or the Plonter structure 480, and use the contents of the identified metadata backup pages to return the mapping structures 470 and 480 to a consistent state. An example of one such data recovery process is discussed further below with respect to FIGS. 7-10.

FIG. 5A shows an example of an H2P structure 470, according to aspects of the disclosure. The H2P structure 470 may include one or more entries 532 and one or more entries 531. Each entry 532 may map a hash digest 534 (e.g., a short hash digest) of a given data block to a corresponding physical address 536 of the location in the storage system 100 where the data block is stored. Furthermore, each entry 532 may include additional metadata 538 associated with the file block, such as hash pool handle identifier, a reference counter, one or more state flags, and one or more extra bits. As discussed above, the entries 532 may be used when requests to read data are serviced by D-nodes in the storage system. Each of the read requests may provide the hash digest of a requested data blocks, and the entries 532 may be used to identify the physical location, based on the provided hash digest, where the data block is stored. Each of the entries 531 may map a hash digest 534 of a given data block and a marker 539 indicating that the data block is unrecoverable. In some implementations, each of the entries 531 may be inserted in the H2P structure 470 after an unsuccessful attempt is made to recover missing or corrupt metadata (e.g., a physical address where the data block stored) that is needed for the retrieval of the data block. In some implementations, each entry 531 may be inserted in the H2P structure to prevent repeated recovery attempts for the same data block or metadata.

FIG. 5B shows an example of the Plonter structure 480, according to aspects of the disclosure. The Plonter structure 480 may include one or more entries 542 and one or more entries 541. Each of the entries 542 may include a logical address 544 corresponding to a respective metadata backup page 490, and a corresponding physical address 548 where a most recent version of the metadata backup page 490 is stored. Each of the entries 541 may include a logical address 544 for a particular metadata backup page 490 and a marker 539 indicating that the metadata backup page 490 is unrecoverable. In some implementations, each of the entries 531 may be inserted in the H2P structure 470 after an unsuccessful attempt is made to recover the metadata backup page. In some implementations, each entry 531 may be inserted in the H2P structure to prevent repeated recovery attempts for the same data block or metadata.

FIG. 5C, shows an example of a metadata backup page 490, according to aspects of the disclosure. The metadata backup page 490 may be used to back up metadata 558. In addition to the metadata 558, the metadata backup page 490 may include a generation counter 552, a timestamp 554, and a page ID 556. In some implementations, the generation counter may include any suitable type of counter that is incremented when the storage system 100 is rebooted. By contrast, the timestamp 554 may include any suitable type of counter that is incremented when a new metadata backup page 490 is generated. In some implementations, the timestamp 554 may be reset after every system reboot, whereas the generation counter 552 may be incremented only with each consecutive system reboot. The term "timestamp counter," as used throughout the disclosure may refer to any suitable type of counter that indicates the relative order in which metadata backup pages 490 are generated between consecutive system reboots and is not limited to counters that identify the actual time when metadata backup pages 490 are generated.

The page ID 556 may uniquely identify a particular metadata backup page 490 from among a plurality of metadata backup pages 490 that constitute a full copy of a particular metadata structure (e.g., an H2P structure, a Plonter structure, etc.). For example, if it takes 10 metadata backup pages 490 to back up the metadata structure, the 10 metadata backup pages 490 that together constitute a full copy of the metadata structure may each be assigned a different page ID between the numbers of 1 and 10. In some implementations, the page IDs of the metadata backup pages 490 may be used to identify a specific metadata backup page 490 which is expected to contain an entry that is missing from a metadata structure (or has become corrupt in the metadata structure).

In some implementations, the metadata 558 may include one or of the more entries 532, and the metadata structure that is backed up using the metadata backup page 490 may include the H2P structure 470. Additionally or alternatively, in some implementations, the metadata 558 may include one or more of the entries 542, and the metadata structure that is backed up using the metadata backup page 490 may include the Plonter structure 480.

Figure 6:
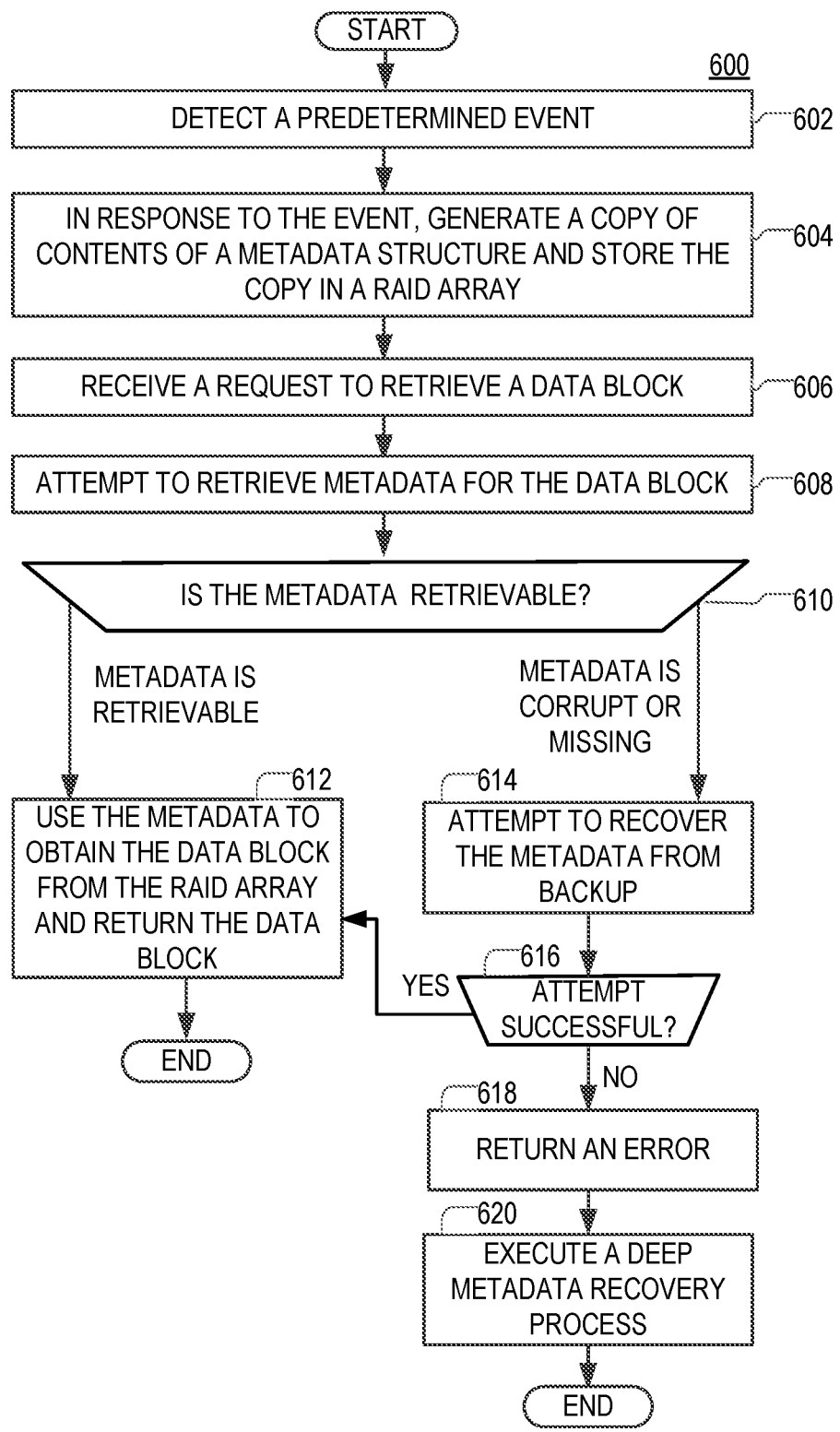
FIG. 6 is a flowchart of an example of a process, according to aspects of the disclosure.

FIG. 6 is a diagram of an example of a process 600 that is performed by one or more storage servers in a storage system, according to aspects of the disclosure. In some implementations, the storage servers may be the same or similar to the storage servers 210, and the storage system may be the same or similar to the storage system 100. At step 602, a predetermined system event is detected. At step 604, in response to the event, a copy of the contents of a metadata structure is stored in one or more storage devices. In some implementations, generating the copy may include generating one or more metadata backup pages, which together include all (or at least a portion) of the contents of the metadata structure. The metadata data structure may include an H2P structure, a Plonter structure, and/or any other suitable type of data structure that includes metadata used by the storage system for the servicing of I/O requests. At step 606, a request is received to retrieve one or more data blocks in the storage system. At step 608, an attempt is made to retrieve, from the metadata structure, metadata that is necessary for fulfilling the request. At step 610, a determination is made if the attempt is successful. If the attempt is successful, the process 600 proceeds to step 612. Otherwise, if the attempt is not successful, this is an indication that the metadata is missing from the metadata structure (e.g., due to being lost or becoming corrupt), and the process proceeds to step 614. At step 612, the request is fulfilled by using the retrieved metadata. At step 614, an attempt is made to recover the missing metadata from one or more of the metadata backup pages that are generated at step 604. As discussed above, the attempt may involve using the Plonter structure 480 to retrieve one or more of the metadata backup pages, extracting the missing metadata from the retrieved metadata backup pages, and storing the extracted metadata in the metadata structure. At step 616, a determination is made if the attempt is successful. If the attempt is successful, the process 600 proceeds to step 612, and the request to retrieve the one or more data blocks is fulfilled by using metadata that is extracted from the metadata backup pages. Otherwise, if the attempt to recover the metadata is unsuccessful, the process proceeds to step 618. At step 618, an error message is returned indicating that the request to retrieve the one or more data blocks cannot be fulfilled. At step 620, a "deep" metadata recovery process is executed in another attempt to recover the metadata. In some implementations, the metadata recovery process may be performed in the manner discussed with respect to FIG. 7.

Figure 7:
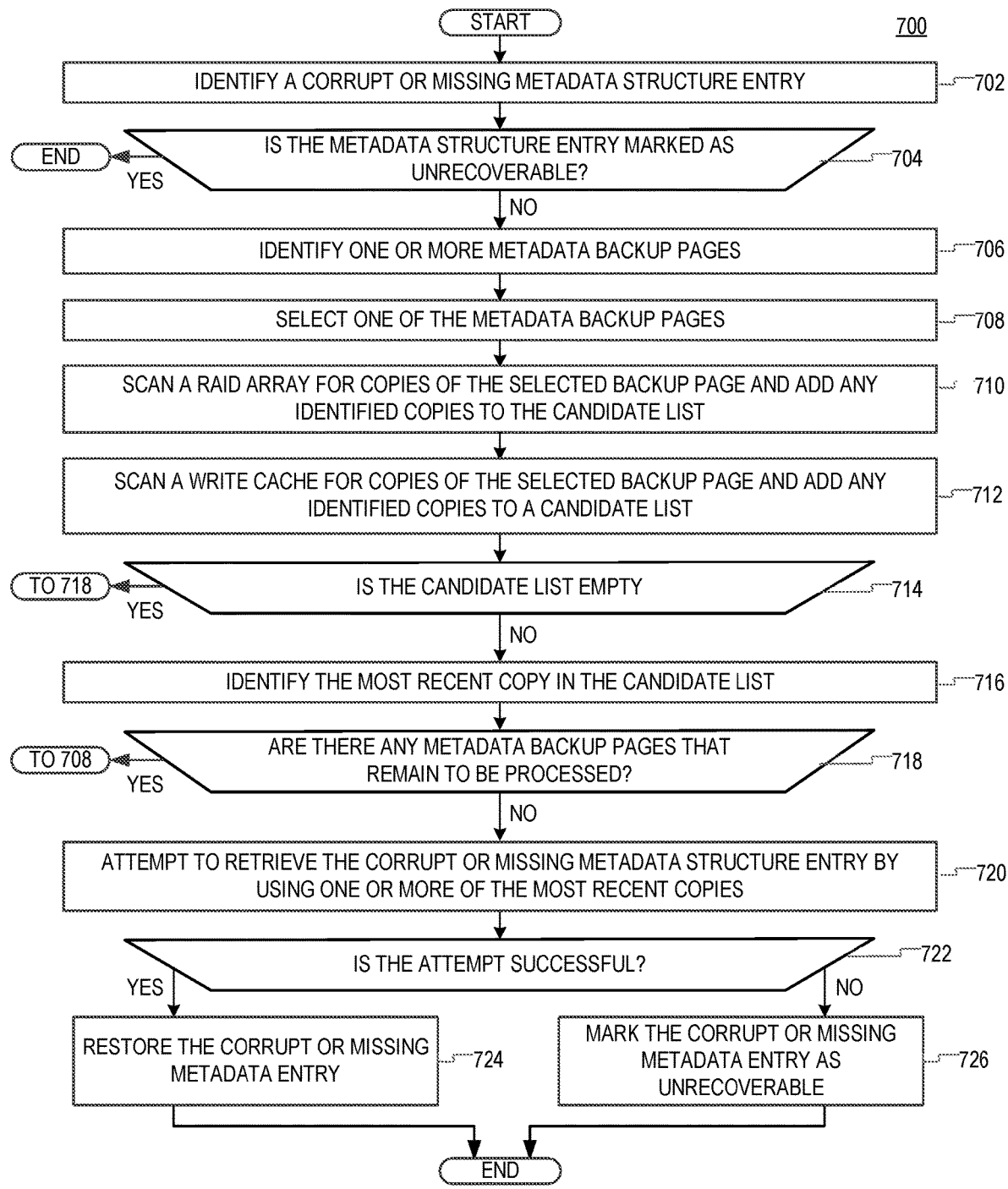
FIG. 7 is a flowchart of an example of a process, according to aspects of the disclosure.

FIG. 7 is a flowchart of a process 700, according to aspects of the disclosure. At step 702, a corrupt or missing metadata structure entry is identified. At step 704, a determination is made if the entry is marked as unrecoverable in the metadata structure. If the entry is marked as unrecoverable, this is an indication that the process 700 has already been unsuccessfully executed once for the entry, and the process 700 ends. If the entry is not marked as unrecoverable, the process proceeds to step 706. At step 706, one or more metadata backup pages are identified. At step 708, one of the metadata backup pages is selected. At step 710, a RAID array is scanned to identify any copies of the selected metadata backup page 490 that are stored in the RAID array, and each of the identified copies is added to a candidate list. In some implementations, step 710 may be performed in accordance with a process 800A, which is discussed further below with respect to FIG. 8A. At step 712, a Write Cache is scanned to identify all copies of the selected metadata backup page 490 that are stored in a Write Cache that is associated with the RAID array, and each of the identified copies is added to the same candidate list. In some implementations, step 710 may be performed in accordance with a process 800B, which is discussed further below with respect to FIG. 8B. At step 714, a determination is made if the candidate list remains empty after the execution of steps 710 and 712. If the candidate list is empty, the process 700 proceeds to step 718. Otherwise, if the candidate list is non-empty, the process 700 proceeds to step 716. At step 716, a most recent copy in the candidate list is identified. At step 718, a determination is made if all of the metadata backup pages identified at step 706 have been processed. If all metadata backup pages have been processed, the process 700 proceeds to step 720. Otherwise, if not all backup pages have been processed, the process 700 returns to step 708 and steps 708-716 are performed again for another one of the metadata backup pages. At step 720, an attempt is made to retrieve the missing or corrupt metadata structure entry from one or more of the most recent copies of metadata backup pages that are identified at step 716. At step 722, a determination is made if the attempt to retrieve the missing or corrupt metadata structure entry has been successful. If the attempt is successful, the process 700 proceeds to step 724. If the attempt is unsuccessful, the process 700 proceeds to step 726. At step 724, the corrupt or missing metadata structure entry is restored. At step 726, the corrupt or missing metadata structure entry is marked as unrecoverable.

In some implementations, the metadata structure may include a Plonter structure, an H2P structure, an A2H structure, and/or any other data structure that is used to store metadata in a storage system, such as the storage system 100. In this regard, the corrupt or missing metadata structure entry may include: (i) a mapping between a hash digest of a data block and a physical location where the data block is stored (e.g., an entry 532), (ii) a mapping between the logical address of a metadata backup page and the physical location where the most recent copy of the metadata backup page is stored (e.g., an entry 542), and/or (iii) any other suitable type of metadata structure entry.

In some implementations, the identification of one or more metadata backup pages which is discussed with respect to step 706 may include determining an identifier of a metadata backup page which is expected to contain the missing or corrupt metadata structure entry. Additionally or alternatively, in some implementations, the identification of one or more metadata backup pages may include determining a plurality of identifiers of metadata backup pages, wherein: (i) each of the identifiers corresponds to a different one of a plurality of metadata backup pages, and (ii) the plurality of metadata backup pages together constitute a full copy (e.g., a most recent copy) of the entire metadata structure where the corrupt or missing metadata entry belongs.

In some implementations, the identification of a most recent copy at step 716 may be performed based on: (i) the respective generation counters of each of the copies in the candidate list, and (ii) the respective timestamps of each of the copies in the candidate list. In some implementations, the most recent entry in the candidate list may be the entry that includes (i) the largest generation counter among all generation counters that are associated with the entries in the candidate list, and (ii) the largest timestamp among all entries in the candidate list that include the largest generation counter.

In some implementations, attempting to retrieve the corrupt or missing metadata structure entry may include determining an identifier of the corrupt or missing metadata entry. Additionally or alternatively, in some implementations, attempting to retrieve the corrupt or missing metadata structure entry may include detecting whether any of the most recent copies identified at step 716 includes an entry whose identifier is the same as (or otherwise matches) the identifier of the corrupt or missing metadata structure entry. Additionally or alternatively, in some implementations, attempting to retrieve the corrupt or missing metadata structure entry may include reconstituting an earlier copy of the metadata structure based on one or more the most recent copies identified at step 716, and detecting whether the earlier copy of the metadata structure includes an entry whose identifier is the same as (or otherwise matches) the identifier of the corrupt or missing metadata entry.

Figure 8B:
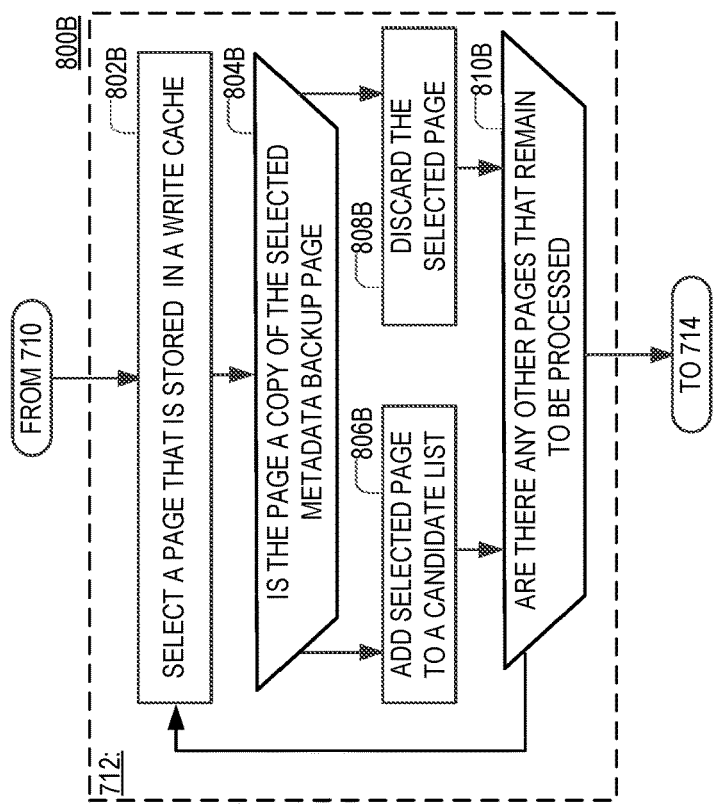
FIG. 8B is a flowchart of an example of a sub-process associated with the process of FIG. 7, according to aspects of the disclosure.
Figure 8A:
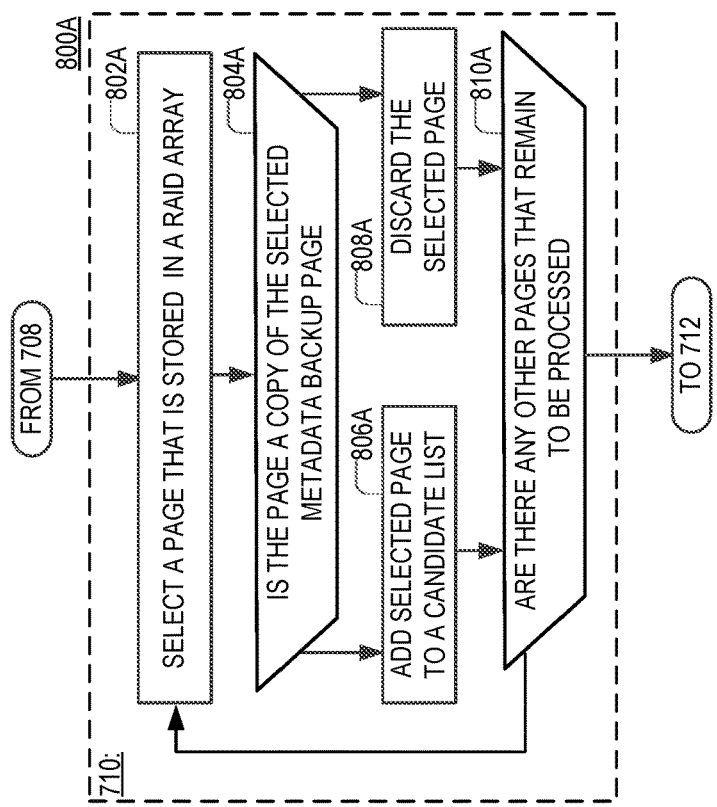
FIG. 8A is flowchart of an example of a sub-process associated with the process of FIG. 7, according to aspects of the disclosure.

FIG. 8A is a flowchart of an example of a process 800A for scanning a RAID array to identify one or more copies of a selected metadata backup page, as specified by step 710 of the process 700. At step 802A, a page that is stored in the RAID array (and/or any other suitable type of storage device) is selected. At step 804A, a determination is made if the selected page is a copy of the selected metadata backup page. In some implementations, the determination may be based on whether an identifier of the metadata backup page that is selected at step 708 matches an identifier of the page that is selected at step 802A. If the selected page is a copy of the selected metadata backup page, the process proceeds to step 806A. Otherwise, if the selected page is not a copy of the metadata backup page, the process proceeds to step 808A. At step 806A, the selected page is added to a candidate list. At step 808A, the selected page is discarded. At step 810A, a determination is made if there are any other pages that remain to be processed. If there are more pages to be processed, the process 800A returns to step 802A, and another page in the RAID array is selected. Otherwise, if there are no more pages in the RAID array that remain to be processed, the process 800A proceeds to step 712.

In some implementations, executing the process 800A may result in a brute force scan of the RAID array in which each and every page (e.g., including both pages that contain production data and metadata backup pages) that is stored in the RAID array is examined to determine whether the page is a copy of the metadata backup page. As a result of this arrangement, orphaned copies of the metadata backup page can be discovered, which cannot be identified in another way. In some implementations, an orphaned copy of metadata backup page may be a copy that is identified (e.g, pointed to) by a Plonter structure, such as the Plonter structure 480. Additionally or alternatively, in some implementations, an orphaned copy of a metadata backup page may be a copy that is not pointed to by a particular file system log of the storage system. In this regard, an orphaned copy of a metadata backup page may include an old generation of the metadata backup page or the most recent generation of the metadata backup page. Additionally or alternatively, in some implementations, an orphaned copy of a metadata backup page, may be a copy that would be erased permanently in the next execution of a garbage collector of the storage system (e.g, a copy that is marked as dirty).

In some implementations, the storage system may be log-structured. As a result, when a new copy of a metadata backup page is generated, the new copy may be written to a new location and a pointer in a file system log may be updated to point to the new copy. Under this arrangement, one or more previous copies of the metadata backup page may not be overwritten when the new metadata backup page is generated, and they may remain intact on the RAID array until they are collected by a garbage collector. Although in the example of FIG. 8A a RAID array is scanned, it will be understood that alternative implementations are possible in which any suitable type of storage device or devices are scanned instead. In some implementations, adding a copy of a metadata backup page to a candidate list may include adding the address (or another identifier) of the copy to a list of addresses (or other identifiers) of other copies of the same metadata backup page. Additionally or alternatively, adding a copy of a metadata page to a candidate list may include moving the copy to a predetermined storage location. It will be understood that the present disclosure is not limited to any specific implementation of the candidate list.

FIG. 8B is a flowchart of an example of a process 800B for scanning a Write Cache to identify one or more copies of a selected metadata page, as specified by step 712 of the process 700. At step 802B, a page that is stored in the Write Cache is selected. At step 804B, a determination is made if the selected page is a copy of the selected metadata backup page. In some implementations, the determination may be based on whether an identifier of the metadata backup page that is selected at step 708 matches an identifier of the page that is selected at step 802B. If the selected page is a copy of the selected metadata backup page, the process proceeds to step 806B. Otherwise, if the selected page is not a copy of the metadata backup page, the process proceeds to step 808B. At step 806B, the selected page is added to a candidate list. At step 808B, the selected page is discarded. At step 810B, a determination is made if there are any other pages that remain to be processed. If there are, the process 800B returns to step 802B, and another page in the Write Cache is selected. Otherwise, if there are no more pages in the Write Cache that remain to be processed, the process 800B returns to step 712.

In some implementations, the Write Cache may include any suitable type of cache where metadata backup pages are stored before being copied to the RAID array discussed with respect to FIG. 8A. In some implementations, the process 800A may result in a brute force scan of the Write Cache in which each and every page that is stored in the Write Cache is examined to determine whether the page is a copy of the metadata backup page. In such implementations, expired metadata backup pages may be identified and added to the candidate list. According to the present example a copy of a metadata backup page is expired if the copy has already been saved in the RAID array and is expected to be erased (or overwritten) from the Write Cache as a result.

Figure 9:
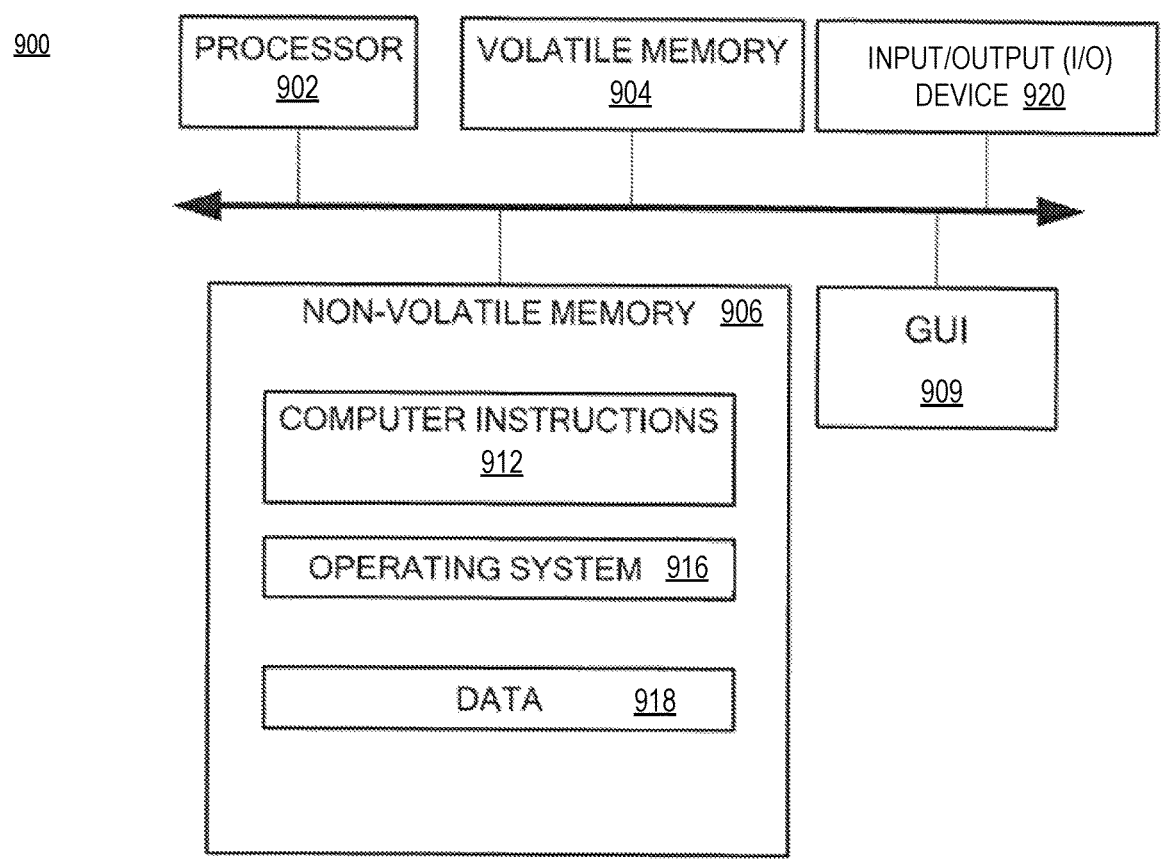
FIG. 9 is a diagram of an example of a computing device, according to aspects of the disclosure.

Referring to FIG. 9, computing device 900 may include processor 902, volatile memory 904 (e.g., RAM), non-volatile memory 906 (e.g., a hard disk drive, a solid state drive such as a flash drive, a hybrid magnetic and solid state drive, etc.), graphical user interface (GUI) 909 (e.g., a touchscreen, a display, and so forth) and input/output (I/O) device 920 (e.g., a mouse, a keyboard, etc.). Non-volatile memory 906 stores computer instructions 912, an operating system 916 and data 918 such that, for example, the computer instructions 912 are executed by the processor 902 out of volatile memory 904. Program code may be applied to data entered using an input device of GUI 909 or received from I/O device 920.

Processor 902 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard-coded into the electronic circuit or soft coded by way of instructions held in a memory device. A "processor" may perform the function, operation, or sequence of operations using digital values or using analog signals. In some embodiments, the "processor" can be embodied in an application specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general-purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid-state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

What is claimed is:

1. A method for recovering metadata, the method comprising:
    identifying a corrupt or missing metadata entry, the corrupt or missing metadata entry being part of a mapping structure that is stored in a random-access memory (RAM) of a storage system;
    selecting a metadata backup page that is associated with the mapping structure;
    identifying a plurality of copies of the selected metadata backup page;
    identifying a most recent copy among the plurality of copies of the selected metadata backup page; and
    recovering the corrupt or missing metadata entry based on the most recent one of the plurality of copies of the metadata backup page,
    wherein the corrupt or missing metadata entry includes a mapping between a logical address of the selected metadata backup page and a physical address in a RAID array where the metadata backup page is stored.

2. The method of claim 1, wherein the corrupt or missing metadata entry includes a mapping between a hash digest of a data page and a physical address in a RAID array where the data page is stored.

3. The method of claim 1, wherein identifying the plurality of copies of the selected metadata backup page includes performing a scan of a RAID array to identify one or more orphaned copies of the selected metadata backup page, and adding the orphaned copies to a candidate list.

4. The method of claim 1, wherein the most recent copy is identified based on: (i) a first counter that is associated with the most recent copy, and (ii) a second counter that is associated with most recent copy, the first counter being non-unique with respect to the most recent copy, and the second counter being unique with respect to the most recent copy.

5. The method of claim 4, wherein the first counter includes a counter that is the same for all metadata backup page copies that are generated in a period between any two consecutive reboots of the storage system, and the second counter includes a counter that is unique for each metadata backup page copy that is generated during the period between any two consecutive reboots of the storage system.

6. A method for recovering metadata, the method comprising:
    identifying a corrupt or missing metadata entry, the corrupt or missing metadata entry being part of a mapping structure that is stored in a random-access memory (RAM) of a storage system;
    selecting a metadata backup page that is associated with the mapping structure;

identifying a plurality of copies of the selected metadata backup page;
identifying a most recent copy among the plurality of copies of the selected metadata backup page; and
recovering the corrupt or missing metadata entry based on the most recent one of the plurality of copies of the metadata backup page,
wherein identifying the plurality of copies of the selected metadata backup page includes performing a scan of a write cache to identify one or more expired copies of the selected metadata backup page, and adding the expired copies to a candidate list.

7. A system, comprising:
a memory; and
at least one processor operatively coupled to the memory, the at least one processor being configured to perform the operations of:
identifying a corrupt or missing metadata entry, the corrupt or missing metadata entry being part of a mapping structure that is stored in a random-access memory (RAM) of a storage system;
selecting a metadata backup page that is associated with the mapping structure;
identifying a plurality of copies of the selected metadata backup page;
identifying a most recent copy among the plurality of copies of the selected metadata backup page; and
recovering the corrupt or missing metadata entry based on the most recent one of the plurality of copies of the metadata backup page,
wherein the corrupt or missing metadata entry includes a mapping between a logical address of the selected metadata backup page and a physical address in a RAID array where the metadata backup page is stored.

8. The system of claim 7, wherein the corrupt or missing metadata entry includes a mapping between a hash digest of a data page and a physical address in a RAID array where the data page is stored.

9. The system of claim 7, wherein identifying the plurality of copies of the selected metadata backup page includes performing a scan of a RAID array to identify one or more orphaned copies of the selected metadata backup page, and adding the orphaned copies to a candidate list.

10. The system of claim 7, wherein the most recent copy is identified based on: (i) a first counter that is associated with the most recent copy, and (ii) a second counter that is associated with most recent copy, the first counter being non-unique with respect to the most recent copy, and the second counter being unique with respect to the most recent copy.

11. The system of claim 10, wherein the first counter includes a counter that is the same for all metadata backup page copies that are generated in a period between any two consecutive reboots of the storage system, and the second counter includes a counter that is unique for each metadata backup page copy that is generated during the period between any two consecutive reboots of the storage system.

12. A system, comprising:
a memory; and
at least one processor operatively coupled to the memory, the at least one processor being configured to perform the operations of:
identifying a corrupt or missing metadata entry, the corrupt or missing metadata entry being part of a mapping structure that is stored in a random-access memory (RAM) of a storage system;
selecting a metadata backup page that is associated with the mapping structure;
identifying a plurality of copies of the selected metadata backup page;
identifying a most recent copy among the plurality of copies of the selected metadata backup page; and
recovering the corrupt or missing metadata entry based on the most recent one of the plurality of copies of the metadata backup page,
wherein identifying the plurality of copies of the selected metadata backup page includes performing a scan of a write cache to identify one or more expired copies of the selected metadata backup page, and adding the expired copies to a candidate list.

* * * * *